US006785953B2

(12) United States Patent
Santini (10) Patent No.: US 6,785,953 B2
(45) Date of Patent: Sep. 7, 2004

(54) PROCESS OF FABRICATING A WRITE HEAD WITH PROTECTION OF A SECOND POLE TIP THICKNESS

(75) Inventor: Hugo Alberto Emilio Santini, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 110 days.

(21) Appl. No.: 09/884,747

(22) Filed: Jun. 18, 2001

(65) Prior Publication Data

US 2002/0191350 A1 Dec. 19, 2002

(51) Int. Cl.[7] .............................. G11B 5/187; B44C 1/22
(52) U.S. Cl. ................. 29/603.14; 29/603.13; 29/603.15; 29/603.18; 29/603.12; 29/603.23; 216/22; 216/38; 360/313; 360/122; 360/125
(58) Field of Search .......................... 29/603.07, 603.12, 29/603.13, 603.14, 603.15, 603.18, 603.23, 603.25; 216/22, 38, 52; 360/313, 122, 125, 126

(56) References Cited

U.S. PATENT DOCUMENTS

| 5,200,056 A | 4/1993 | Cohen et al. ................ 205/122 |
| 5,245,493 A | 9/1993 | Kawabe et al. ............. 360/126 |
| 5,282,308 A | 2/1994 | Chen et al. .............. 29/603.18 |
| 5,406,434 A | 4/1995 | Amin et al. ................. 360/126 |
| 5,559,654 A | 9/1996 | Das ............................. 360/126 |
| 5,649,351 A | 7/1997 | Cole et al. ............... 29/603.14 |
| 5,710,683 A | 1/1998 | Sundaram .................... 360/126 |
| 5,802,700 A | 9/1998 | Chen et al. .............. 29/603.14 |
| 5,805,391 A | 9/1998 | Chang et al. ................ 360/126 |
| 5,831,801 A | 11/1998 | Shouji et al. ................ 360/126 |
| 5,867,890 A | 2/1999 | Hsiao et al. ............. 29/603.14 |
| 5,872,693 A | 2/1999 | Yoda et al. .................. 360/126 |
| 5,901,432 A | 5/1999 | Armstrong et al. ....... 29/603.14 |
| 5,916,423 A | 6/1999 | Westwood ............. 204/192.32 |
| 5,940,253 A | 8/1999 | Mallery et al. ............. 360/126 |
| 6,018,862 A | 2/2000 | Stageberg et al. ........ 29/603.14 |
| 6,031,695 A | 2/2000 | Hsiao et al. ................. 360/126 |
| 6,173,486 B1 * | 1/2001 | Hsiao et al. ............. 29/603.14 |

FOREIGN PATENT DOCUMENTS

JP          3-252907       * 11/1991

OTHER PUBLICATIONS

Kim et al, "Design of Recessed Yoke Heads for Minimizing Adjacent Track Encroachment", IEEE Transactions on Magnetics, vol. 36, No. 5, pp. 2524–2526, Sep. 2000.*

* cited by examiner

*Primary Examiner*—A. Dexter Tugbang
(74) *Attorney, Agent, or Firm*—Ervin F. Johnston (57) ABSTRACT

A method of making a magnetic head, which has an air bearing surface (ABS) and a back gap (BG), comprising the steps of: forming a second pole tip of a second pole piece with a top surface and a bottom surface at an ABS site for said ABS; the top surface of the second pole tip having a write region located at the ABS site and a stitch region which is recessed in its entirety from the ABS site toward said back gap; depositing a protective sacrificial layer on the write region of the second pole tip; removing said sacrificial layer from only the stitch region of the second pole tip; and forming a second pole piece yoke of a second pole piece magnetically connected to the stitch region of the second pole tip.

19 Claims, 9 Drawing Sheets

PROCESS OF FABRICATING A WRITE HEAD WITH PROTECTION OF A SECOND POLE TIP THICKNESS

BACKGROUND OF THE INVENTION

1. Field of the Invention

The present invention relates to a method of protecting a second pole tip thickness during fabrication of a write head and, more particularly, to preventing a reduction in the thickness of the second pole tip during subsequent processing steps, such as seed layer removal, sputter cleaning the wafer and formation of studs for terminals.

2. Description of the Related Art

The heart of a computer is a magnetic disk drive which includes a rotating magnetic disk, a slider that has read and write heads, a suspension arm above the rotating disk and an actuator arm that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

A write head typically employs ferromagnetic first and second pole pieces which are capable of carrying flux signals for the purpose of writing magnetic impressions into a track on a magnetic medium, such as a rotating magnetic disk. Each of the first and second pole pieces has a yoke region which is located between a pole tip region and a back gap region. The pole tip region is located at the ABS and the back gap region is spaced from the pole tip region at a recessed location within the write head. At least one coil layer is embedded in an insulation stack which is located between the first and second pole pieces in the yoke region. A nonmagnetic write gap layer is located between the pole tip regions of the first and second pole pieces. The thinner the thickness of the write gap layer, the greater the number of bits the write head can write into the track of a rotating magnetic disk. The first and second pole pieces are magnetically connected at the back gap. Processing circuitry digitally energizes the write coil which induces flux into the first and second pole pieces so that flux signals bridge across the write gap at the ABS to write the aforementioned magnetic impressions or bits into the track of the rotating disk. The second pole piece has a second pole piece yoke (P2 yoke) which is magnetically connected to the second pole tip (P2 tip) and extends to the back gap for connection to the first pole piece.

A write head is typically rated by its areal density which is a product of its linear bit density and its track width density. The linear bit density is the number of bits which can be written per linear inch along the track of a rotating magnetic disk and the track width density is the number of tracks that can be written per inch along a radius of the rotating magnetic disk. The linear bit density is quantified as bits per inch (BPI) and the track width density is quantified as tracks per inch (TPI). As discussed hereinabove, the linear bit density depends upon the thickness of the write gap layer. The track width density is directly dependent upon the width of the second pole tip at the ABS. Efforts over the years to increase the areal density of write heads has resulted in computer storage capacities increasing from kilobytes to megabytes to gigabytes.

The first and second pole pieces, including the second pole tip, are typically fabricated by plating techniques. The strong-felt need to fabricate second pole tips with submicron widths is limited by the resolution of the fabrication techniques. The second pole tip is typically fabricated by frame plating. Photoresist is employed to provide the frame and a seed layer is employed to provide a return path for the plating operation. A typical sequence for fabricating a second pole tip, as well as other components of the first and second pole pieces, is to sputter clean the wafer, sputter deposit a seed layer, such as nickel iron, on the wafer, spin a layer of photoresist on the wafer, light-image the photoresist layer through a mask to expose areas of the photoresist that are to be removed (assuming that the photoresist is a positive photoresist), develop the photoresist to remove the light-exposed areas to provide an opening in the photoresist at the pole tip region and then plate the second pole tip in the opening up to a desired height.

It is necessary that a second pole tip have a sufficient amount of volume at the ABS in order to conduct the required amount of flux for writing the signals into the magnetic disk. If the second pole tip is made thinner, it must be made higher in order to provide the necessary volume of magnetic material. Unfortunately, as the track width becomes narrower the resolution of the photoresist decreases. Resolution is quantified as aspect ratio which is the width of the second pole tip versus the thickness of the photoresist. As the thickness of the photoresist increases the light penetration during the light-imaging step loses its columnation as it travels toward the bottom of the photoresist. The result is that the side walls of the photoresist frame are jagged which results in jagged side walls of the second pole tip.

The aforementioned problems are particularly manifested when the second pole tip and the yoke of the second pole piece are plated simultaneously in a common photoresist frame. In addition to loss of resolution with an increasing height of the second pole tip, there is also notching of the side walls of the photoresist frame, and consequently the second pole tip, due to reflection of light from a seed layer on the insulation stack immediately behind the pole tip region. One method to overcome this problem has been to employ a stitched "T"-shaped second pole piece which is fabricated by first making only the second pole tip portion with a photoresist frame and then subsequently making the yoke portion of the second pole piece with a second photoresist frame with the yoke portion being stitched (magnetically connected) to a stitch region at the top of the second pole tip. This type of second pole piece is referred to as a stitched "T" because the yoke portion extends laterally across the top of the pole tip portion, forming the configuration of a "T". The yoke portion can be stitched across the entire top surface of the second pole tip in which case it is exposed at the ABS or it may be recessed from the ABS, as desired.

Unfortunately, processing steps subsequent to the construction of the second pole tip decrease the height of the second pole tip and can seriously damage its side walls. When the second pole piece is a continuous pole tip and yoke combination these processing steps are removal of the seed layer by sputter etching after removal of the photoresist frame and the fabrication of studs for write head and read head terminals which involves sputter etching to clean the wafer, depositing a seed layer, photoresist framing the areas involved, plating the studs, removing the photoresist layer and sputter etching the exposed seed layer. While these steps lessen the height of the second pole tip of the continuous second pole tip and yoke combination, it is even more aggravated with the stitched "T" type of second pole piece. After the second pole tip of the stitched "T" is fabricated, sputter etching is required to remove the seed layer employed to fabricate the pole tip which further reduces the height of the second pole tip. Further, if chemical mechanical polishing (CMP) is employed for planarizing the wafer, preparation steps for this operation can further reduce the height of the second pole tip.

In order to overcome the loss of height of the second pole tip while maintaining a narrow track width (width of the second pole tip) the second pole tip can be frame plated to a greater height so that after the processing steps the remaining height of the second pole tip is at a desired level. Unfortunately, this requires the photoresist frames to be thicker which increases the aforementioned aspect ratio. Consequently, the resolution of the photoresist frame is lessened which degrades the resolution of the finally plated second pole tip.

SUMMARY OF THE INVENTION

The present invention provides a stitched "T" type of second pole piece wherein the second pole tip portion is protected from a reduction in height due after subsequent processing steps. In the present invention the top surface of the second pole tip has a write region which is located at the ABS and a stitch region which is recessed from the ABS toward the back gap. A protective sacrificial layer is deposited on the write region of the second pole tip and the second pole piece yoke is magnetically connected to the stitch region. The method includes first depositing the sacrificial layer on both the write region and the stitch region of the second pole tip. The sacrificial layer is then removed from only the stitch region of the second pole tip leaving a portion of the sacrificial layer covering the write region of the second pole tip.

Several methods are employed for accomplishing these steps. In a first embodiment, the sacrificial layer is deposited over the entire wafer. The sacrificial layer is then chemically mechanically polished (CMP) until it is flat, but stopping the CMP before the top surface of the second pole tip is exposed, and then before forming the second pole piece yoke, removing the sacrificial layer from only the stitch region by sputter etching or ion milling until the stitch region is exposed. The second pole piece yoke is then stitched to the exposed stitch region of the second pole tip. In another embodiment the second pole tip is provided with an upstanding pedestal which is located in the stitch region. Again the sacrificial layer is deposited over the entire wafer, the sacrificial layer is then chemically mechanically polished until it is flat and until the pole tip pedestal in the stitch region is exposed, but stopping the chemical mechanical polishing before the write region of the second pole tip is exposed. The second pole piece yoke is then magnetically connected to the second pole tip pedestal. The invention provides a unique method of obtaining the second pole tip pedestal by forming an insulation layer directly below the second pole tip before its formation and then forming a second pole tip so that the profile of the insulation layer forms the second pole tip with the pedestal.

In a preferred embodiment of the invention the write head employs first and second coil layers which are embedded in first and second insulation stacks which are stacked on top of each other. This is accomplished by providing the first pole piece with a first pole piece layer and first and second spaced-apart pedestals which are magnetically connected to the first pole piece layer. The first pedestal is located at the ABS and the second pedestal is located at the back gap. The first insulation stack with the first write coil embedded therein is located in the space between the first and second pedestals and is separated from the first pole piece layer by a first insulation layer. The write gap layer is located on the first pedestal and may extend all the way from the ABS to the back gap. The second pole piece includes the second pole tip portion at the ABS and a back gap pedestal at the back gap with a yoke portion extending between the second pole tip and the back gap pedestal and magnetically connected thereto. The second pole tip is separated from the first pedestal of the first pole piece by the write gap layer. The second insulation stack with the write coil embedded therein is located between the second pole tip and the back gap pedestal and may be separated or further separated from the first write coil by a second insulation layer. The sacrificial layer is then formed over the entire wafer and the stitch region of the second pole tip is exposed by one of the methods described hereinabove followed by fabrication of the second pole piece yoke. In a preferred embodiment, the aforementioned first insulation layer, the second insulation layer and the sacrificial layer are chemically mechanically polished (CMP). Further, the composition of each of the first and second insulation layers and the sacrificial layer is preferably alumina.

An object of the present invention is to protect a pole tip portion of a second pole tip in a stitched "T" second pole piece from subsequent processing steps.

Another object is to provide unique methods for exposing a stitch region of the second pole tip for stitching a yoke portion of a second pole piece thereto.

A further object is to accomplish the aforementioned objects with first and second insulation stacks with first and second write coils embedded therein.

Still another object is to provide the various write heads fabricated by the aforementioned methods.

Other objects and attendant advantages of the invention will be appreciated upon reading the following description taken together with the accompanying drawings.

DESCRIPTION OF THE PREFERRED EMBODIMENTS

Magnetic Disk Drive

Figure 1:
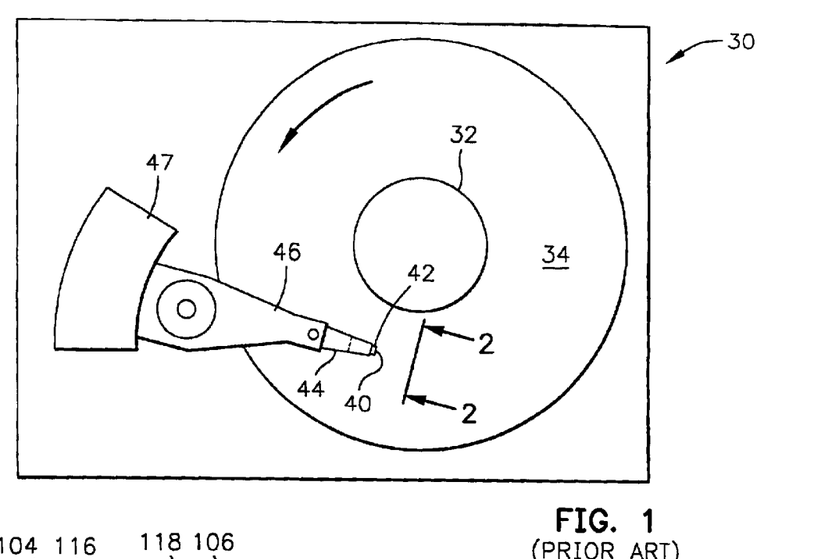
FIG. 1 is a plan view of an exemplary prior art magnetic disk drive.
Figure 2:
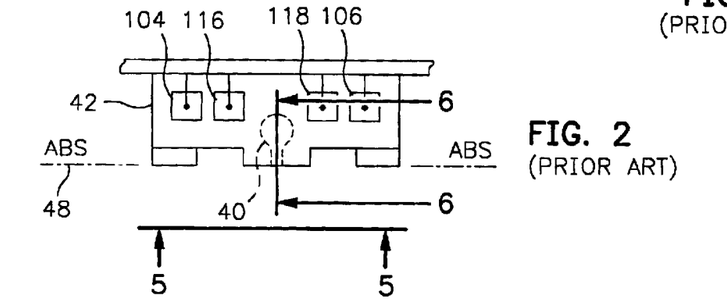
FIG. 2 is an end view of a prior art slider with a magnetic head of the disk drive as seen in plane 2—2 of FIG. 1.
Figure 3:
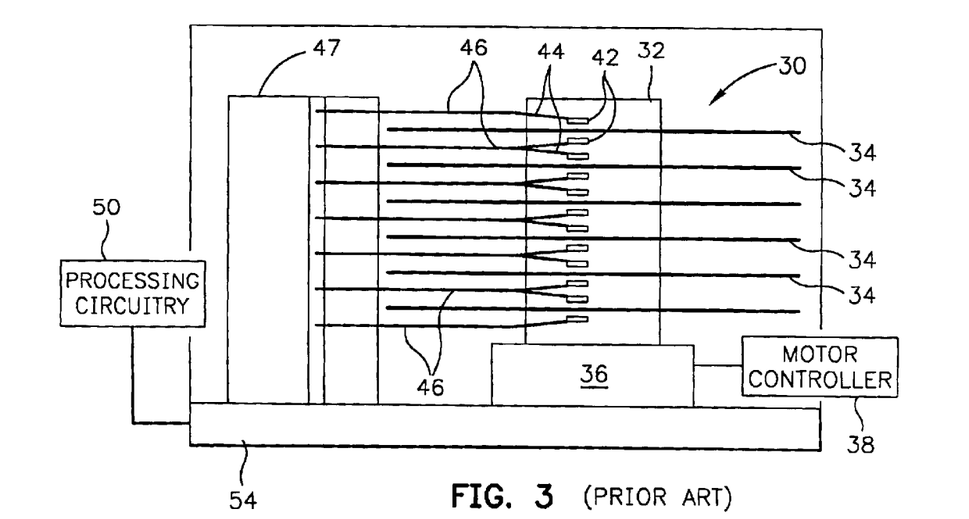
FIG. 3 is an elevation view of the prior art magnetic disk drive wherein multiple disks and magnetic heads are employed.
Figure 4:
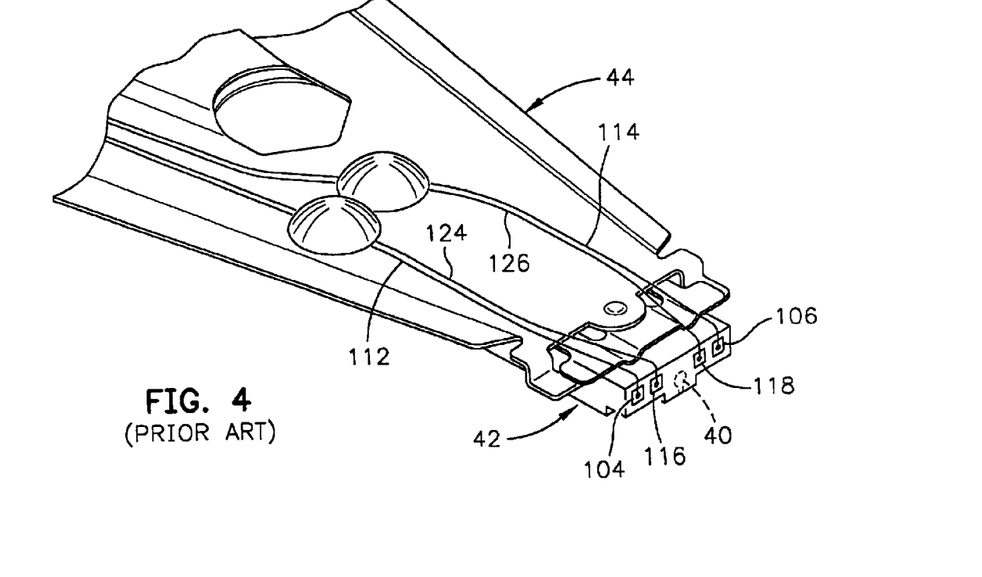
FIG. 4 is an isometric illustration of an exemplary prior art suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 µm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing, as shown in FIG. 3.

Figure 5:
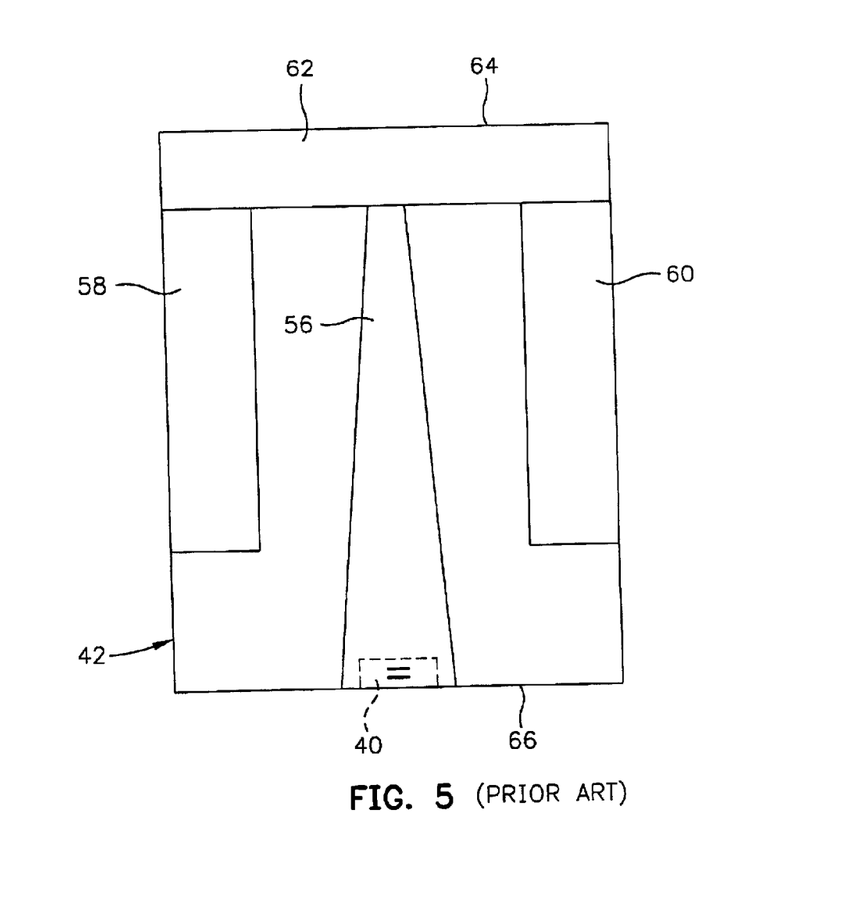
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figures 6, 7, 8:
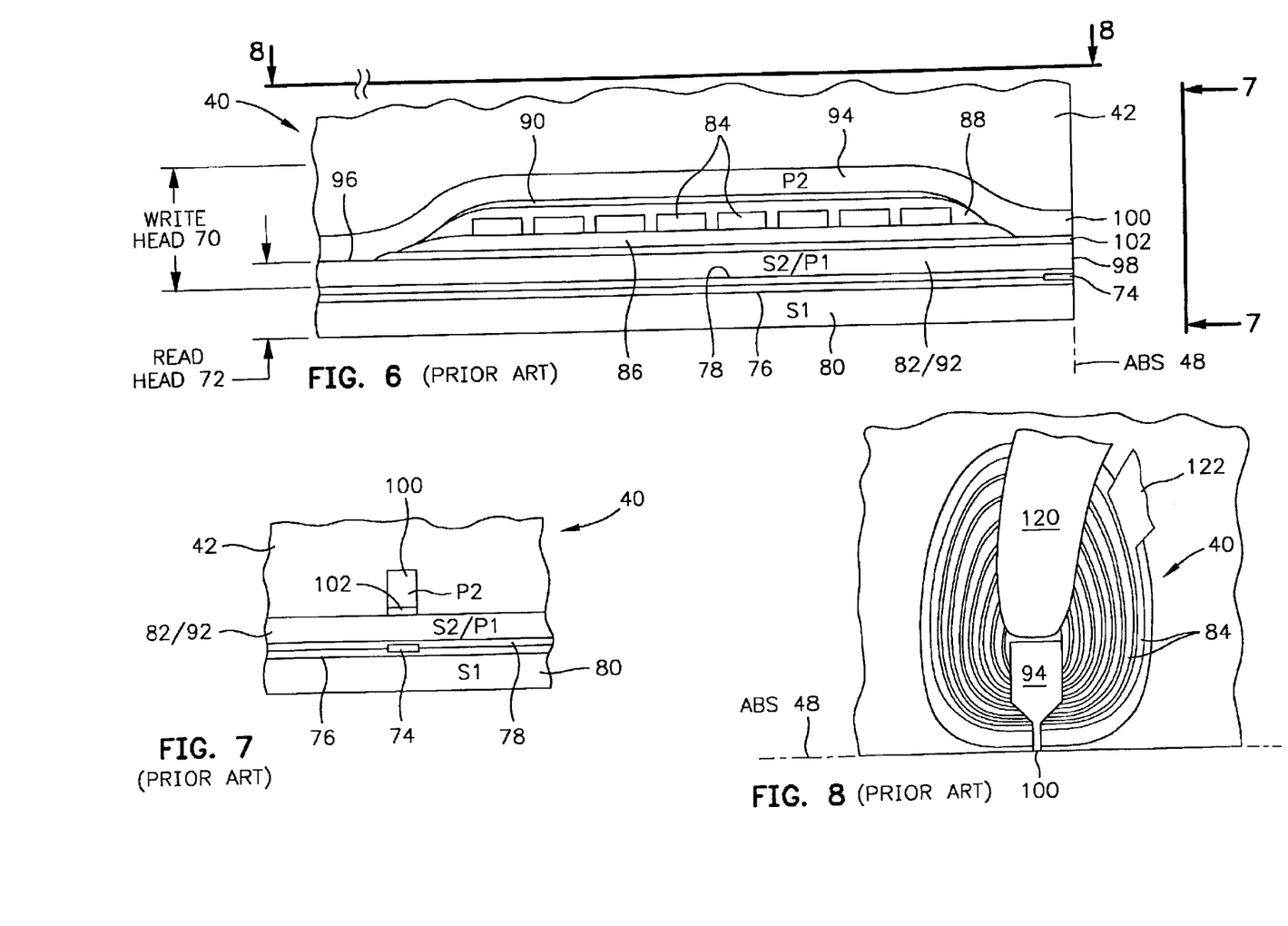
FIG. 6 is a partial view of the slider and a prior art merged magnetic head as seen in plane 6—6 of FIG. 2.
FIG. 7 is a partial ABS view of the slider taken along plane 7—7 of FIG. 6 to show the read and write elements of the magnetic head.
FIG. 8 is a view taken along plane 8—8 of FIG. 6 with all material above the coil layer and leads removed.

FIG. 6 is a side cross-sectional elevation view of a merged magnetic head 40, which includes a write head portion 70 and a read head portion 72, the read head portion employing a sensor 74. FIG. 7 is an ABS view of FIG. 6. The sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the sensor 74 changes. A sense current $I_s$ conducted through the sensor causes these resistance changes to be manifested as potential changes. These potential changes are then processed as readback signals by the processing circuitry 50 shown in FIG. 3.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. Since the second shield layer 82 and the first pole piece layer 92 are a common layer this head is known as a merged head. In a piggyback head these layers are separate layers which are separated by an insulation layer. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 8) to leads 124 and 126 on the suspension.

First Embodiment of the Invention

Figure 14:
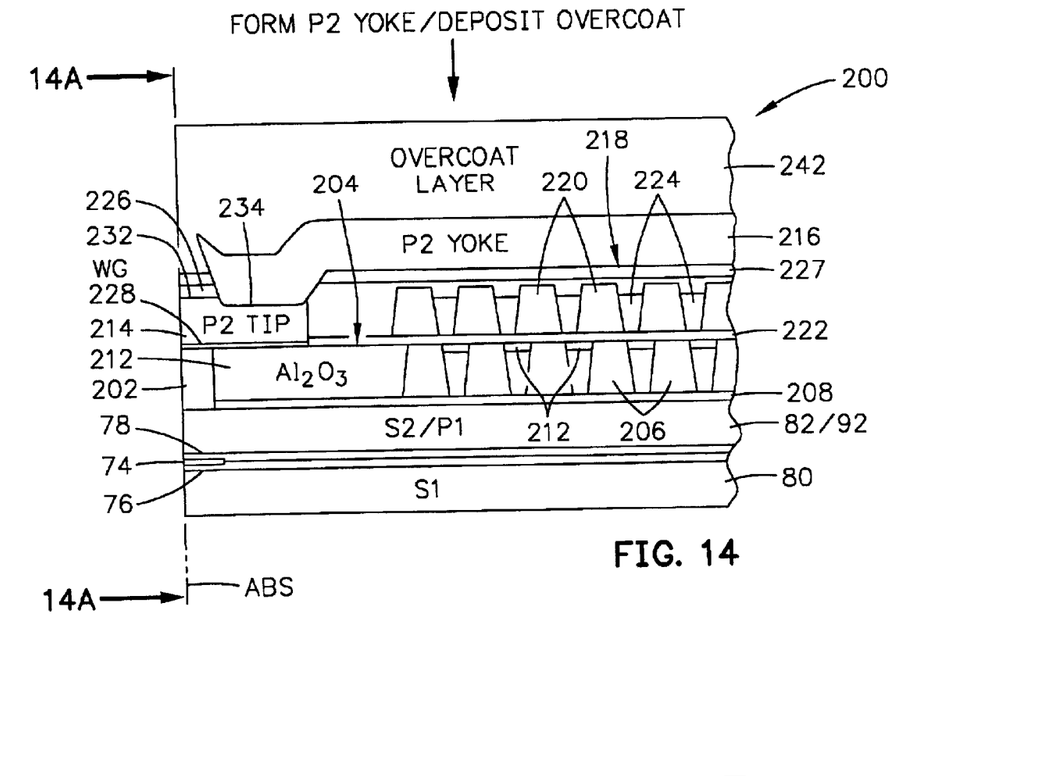
FIG. 14 is the same as FIG. 13 except a second pole piece yoke has been formed.
Figure 17:
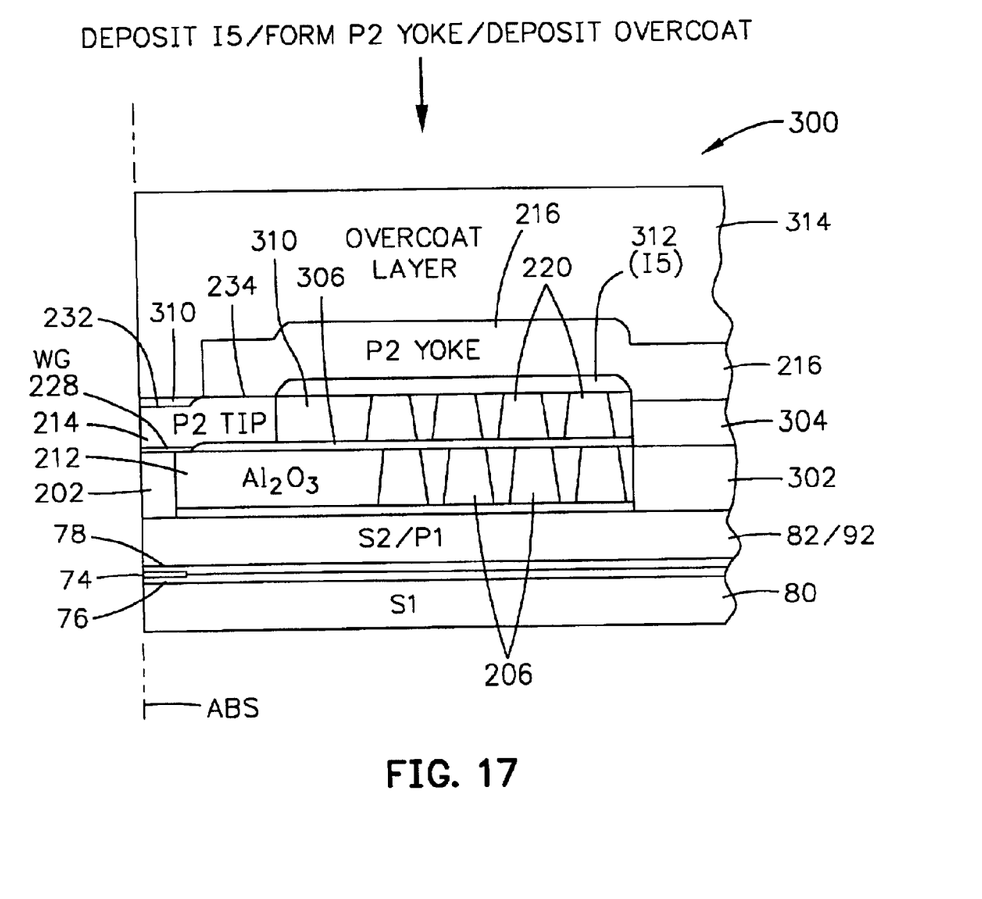
FIG. 17 is the same as FIG. 16 except a second pole piece yoke has been stitched to the second pole tip.

The magnetic head 200 in FIG. 14 illustrates a first embodiment of the present invention constructed on a wafer 201. The magnetic head may include the read head portion 72 in FIG. 6 which includes the read sensor 74 which is located between first and second read gap layers 76 and 78 which are, in turn, located between first shield layer (S1) 80 and the combined second shield/first pole piece layer (S2/P1) 82/92. The write head portion of the head also includes a first pole piece pedestal 202 which is magnetically connected to the first pole piece 92 and is located at the air bearing surface (ABS). The first pole piece also includes a second pedestal which is located at a back gap and will be described in a second embodiment of the present invention, as shown in FIG. 17. A first insulation stack 204 with a write coil layer 206 embedded therein is located between the first and second pedestals. The first insulation stack 204 may include a first insulation layer 208 which separates the write coil 206 from the first pole piece 92, a second insulation layer 210 of baked photoresist which partially insulates the write coil 206 between its coils and is located below the top of the write coil and a third insulation layer 212 which is also located between the turns of the write coil and is flush with the top of the write coil.

The second pole piece includes a second pole tip 214, a back gap pedestal which is located at the back gap and spaced from the second pole tip 214 which will be described in the second embodiment of the invention, as shown in FIG. 17, and a second pole piece yoke 216. A second insulation stack 218 is located in the space between the second pole tip 214 and the back gap yoke and has a second write coil 220 embedded therein. The second insulation stack 218 may include a fourth insulation layer 222, a fifth insulation layer 224 of baked photoresist which partially insulates between the turns of the write coil 220 and is located a distance below a top surface thereof, and a fifth insulation layer 226 which also insulates between the turns of the write coil 220 and is located above and insulates the top of the write coil 220. The second pole tip 214 is separated from the first pedestal 202 by a write gap layer 228. The write gap layer 228 may extend into the yoke region and provide the only insulation or extra insulation between the first and second write coil layers 206 and 220.

According to the present invention the second pole tip 214 has a pole tip region 232, which is located at the ABS, and a stitch region 234 which is recessed from the ABS. The yoke 216 is magnetically connected to the stitch region 234 of the second pole tip and is magnetically connected to the back gap pedestal, which will be described in the second embodiment. The write portion 232 of the second pole tip is provided with insulation, such as a portion of insulation layer 226, before fabrication of the second pole piece yoke 216. This protects the height of the second pole tip from subsequent processing steps, such as sputter etching the seed layers for the second pole tip as well as the yoke, and subsequent construction of studs for read and write terminals of the head. The insulation layers 208, 212, 222, 226 and the write gap layer 228 are preferably alumina. In the preferred embodiment chemical mechanical polishing (CMP) is employed for planarizing the wafer at various stages in the fabrication, such as flattening layers 208, 212 and 226.

It should be understood that the magnetic head is constructed as one head in an array of magnetic heads on a wafer substrate which are arranged in rows and columns. After completion of the magnetic heads, which includes the studs for terminals (not shown) and an overcoat layer 242, the magnetic heads are diced into rows of magnetic heads after which they are lapped to the ABS, as shown in FIG. 14. The row of heads is then diced into individual heads and mounted on the magnetic disk drive shown in FIGS. 3 and 4. CMP may be first employed after depositing a thick alumina layer and then CMP the thick alumina layer until the top of the S2/P1 layer 82/92 is exposed. Then the first insulation layer 208 is formed with a proper thickness. Before or after constructing the write coil 206 the first pedestal 202 and a second pedestal can be formed on the first pole piece layer 92 after etching away a portion of the first insulation layer 208 so that magnetic connections can be made. The second CMP may be employed after depositing a thick alumina layer on top of the write coil 206 until the top of the coil layer 206 is exposed. Then the insulation layer 222 can be formed. A front portion of this insulation layer may then be etched away and the write gap layer 228 of a predetermined thickness may be formed on top of the pedestal 202. After constructing the second write coil layer 220 another thick alumina layer may be deposited and CMP until the fifth insulation layer 226 is flat without exposing the top surface of the second pole tip 214 and the top portion of the write coil 220. A portion of the insulation layer 226 is then etched away from the stitch region 224 of the second pole tip and the second pole piece yoke 216 is formed. The CMP operations planarize the head which enables the yoke 216 to be more planar and better able to conduct flux to the second pole tip 214.

Method of Fabricating First Embodiment

Figure 9:
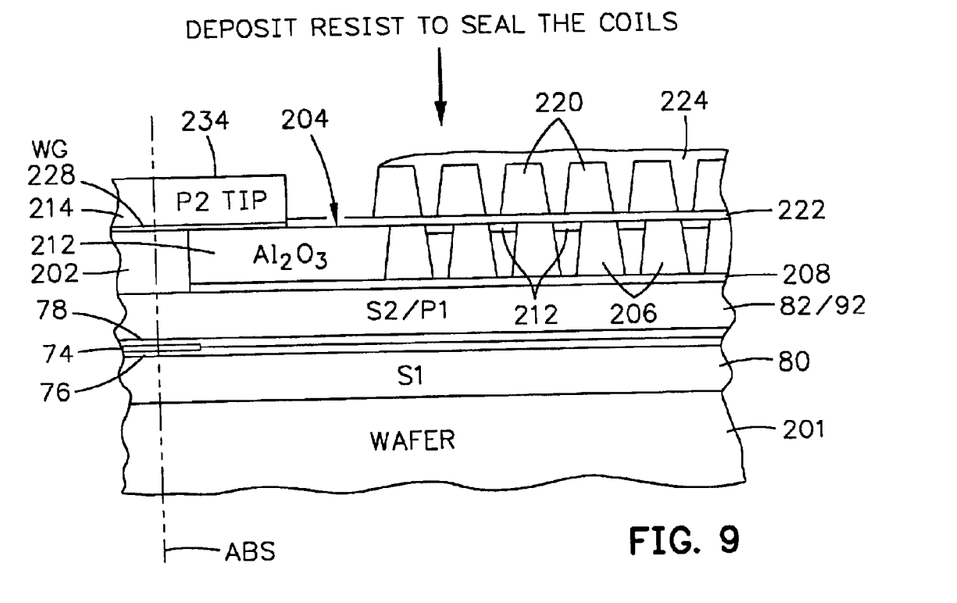
FIG. 9 is a side view of a first embodiment of the write head similar to the view shown in FIG. 6.

FIGS. 9–14 illustrate various steps in the construction of the write head 200 shown in FIG. 14. After constructing the first write coil 206 a thick layer of alumina is deposited on the wafer 201 and the wafer is CMP until the top surfaces of the write coil layer 206, the pedestal 202 and the alumina layer 212 are planar. The insulation layer 222 covers the top surface of the write coil layer 206 and the photoresist layer 224 is formed between the turns of the write coil 220 as shown in FIG. 9.

Figure 10:
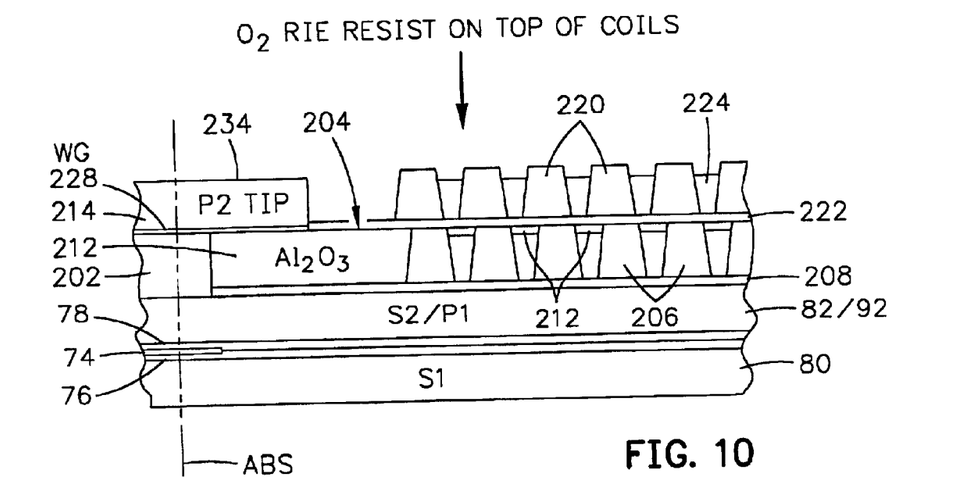
FIG. 10 is the same as FIG. 9 except a portion of a photoresist layer has been removed.
Figure 11:
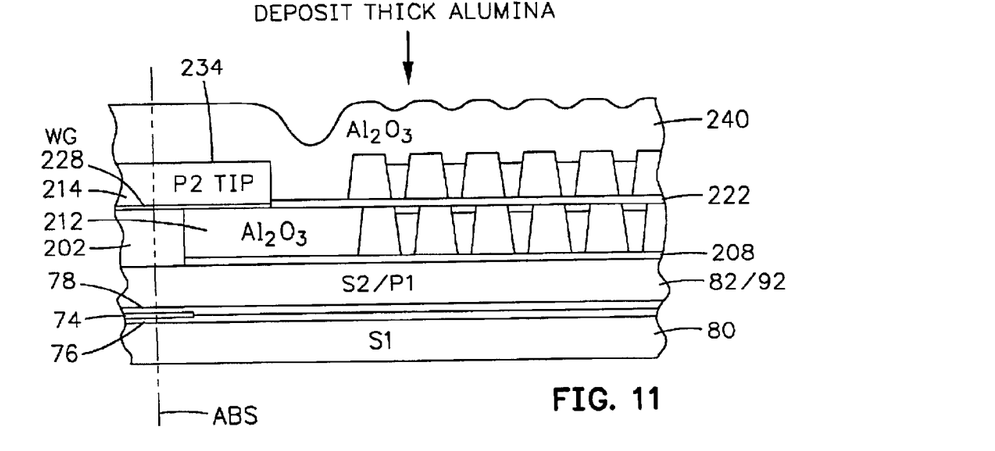
FIG. 11 is the same as FIG. 10 except a thick layer of alumina has been deposited on the wafer.
Figure 12:
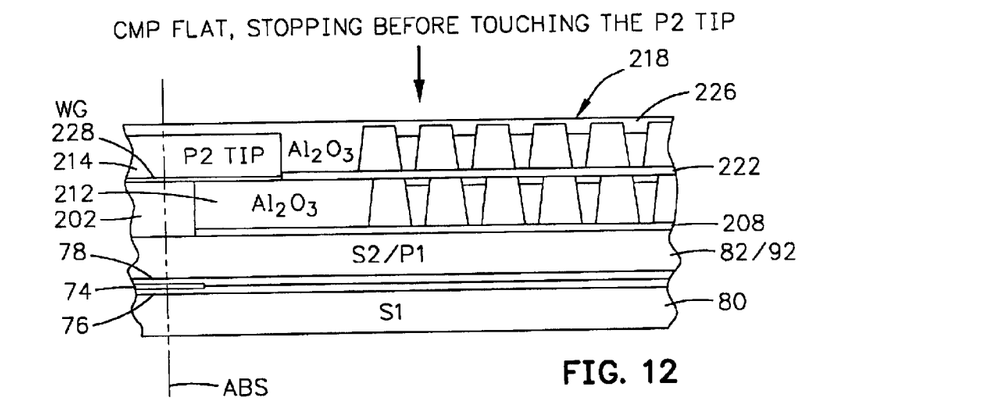
FIG. 12 is the same as FIG. 11 except the alumina layer has been chemically mechanically polished (CMP)
Figure 13:
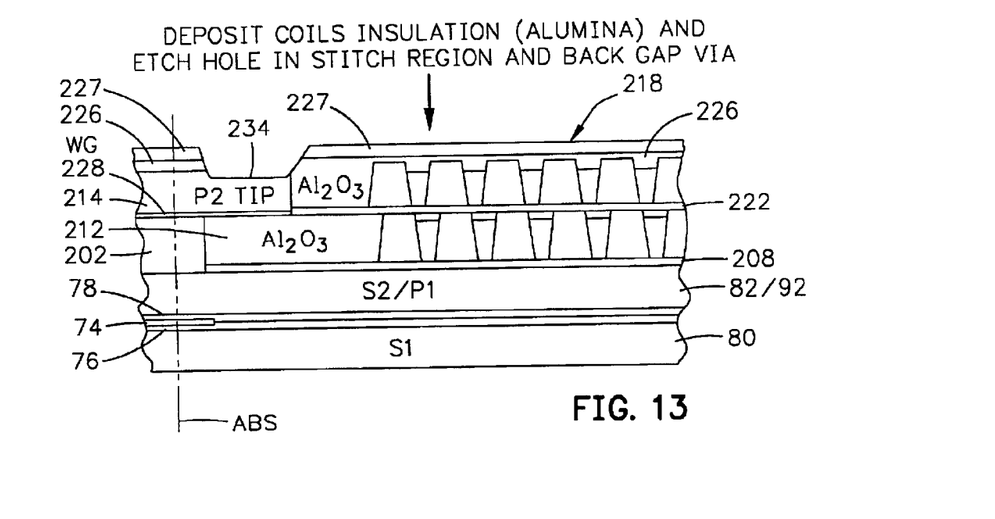
FIG. 13 is the same as FIG. 12 except the alumina layer has been removed from a stitch region of a second pole tip.

In FIG. 10 oxygen-based reactive ion etching ($O_2$ RIE) may be employed for removing a top portion of the resist layer 224 below a top of the write coil 220. In FIG. 11, a thick layer of alumina 240 is deposited over the wafer with a thickness greater than the thickness of the write coil layer 220 and a thickness of the second pole tip 214 filling in a remainder of the turns of the write coil 220. In FIG. 12 CMP is employed for polishing the alumina layer 240 in FIG. 11 until the insulation layer 226 is formed flat a distance above the top of the second pole tip 214 and optionally above the top of the write coil 220. Important in this step is that the CMP be terminated before it touches the top surface of the second pole tip 214 so that a portion of the insulation layer 226 remains thereon. In FIG. 13 an insulation layer 227 may be deposited and the insulation layers 226 and 227 are etched to expose the stitch region 234 of the second pole tip. In FIG. 14 the second pole piece yoke 216 is magnetically connected to the second pole tip at the stitch region 234 and is extended over the insulation layer 226 above the write coil 220. An overcoat layer 242 may be subsequently formed.

Figure 14A:
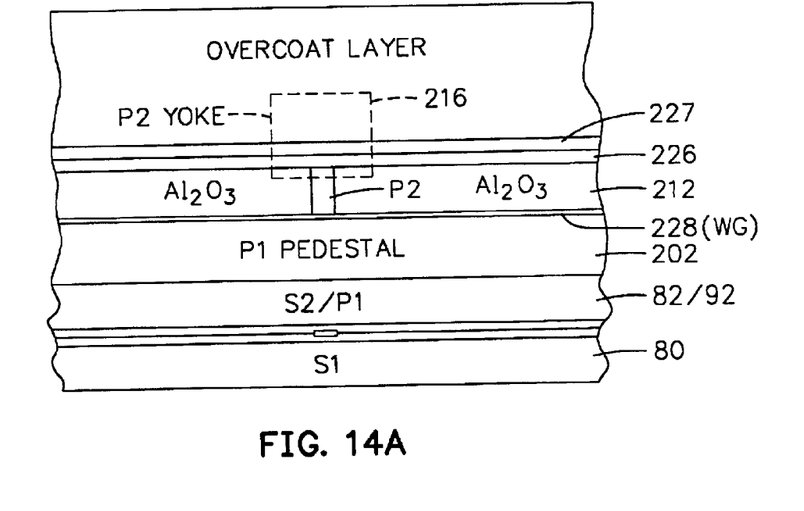
FIG. 14A is a view taken along plane 14A—14A of FIG. 14.

It should be noted that the insulation layer 226 protects the pole tip region 232 when a seed layer for the yoke 216 is removed by etching and studs are formed for terminals for the read and write head portions of the head. FIG. 14A is an ABS illustration of the magnetic head shown in FIG. 14.

Second Embodiment of the Invention

Figure 15:
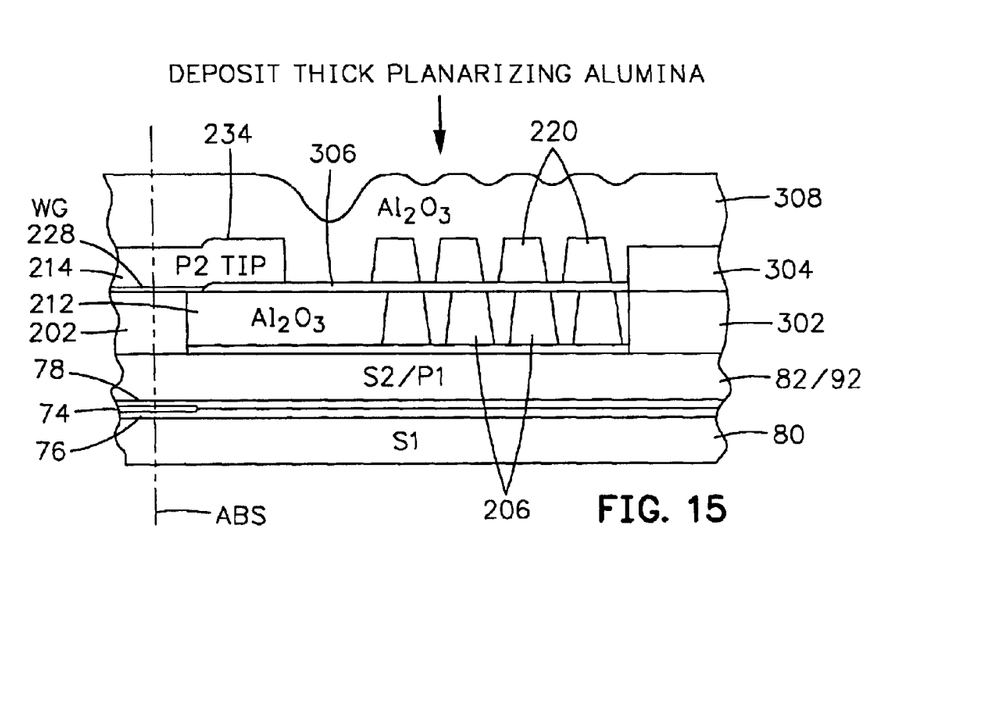
FIG. 15 is a side view of a second embodiment of the present invention which is a similar view to FIG. 11 after depositing a thick alumina layer.
Figure 16:
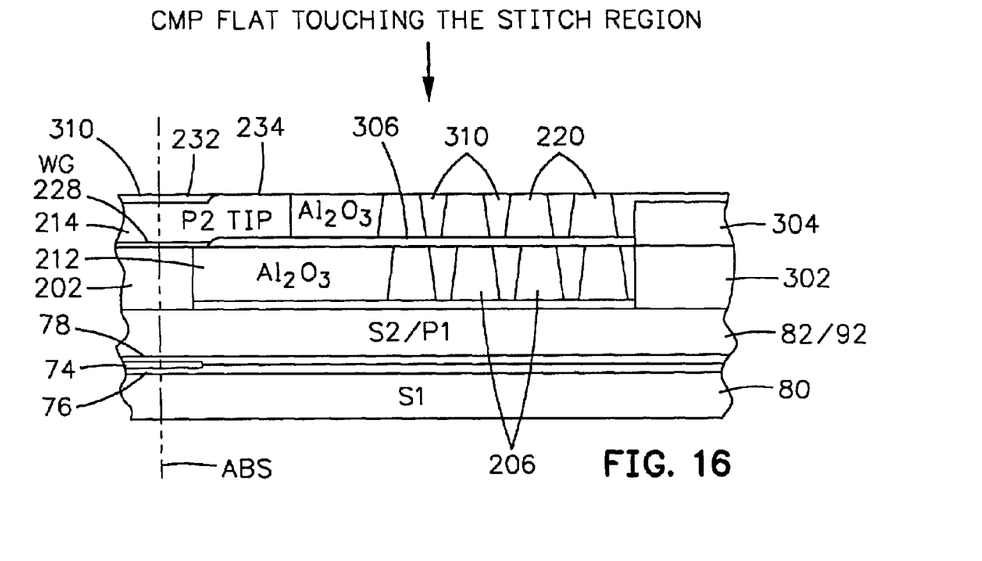
FIG. 16 is the same as FIG. 15 except the thick alumina layer has been chemically mechanically polished (CMP)

FIGS. 15, 16 and 17 illustrate a second embodiment of the present head 300, as shown in FIG. 17, and its method of making. The write head 300 is similar to the write head in FIGS. 14 and 14A and shows the aforementioned second pedestal 302 of the first pole piece and the back gap pedestal 304 of the second pole piece. It can be seen that these two pedestals are magnetically connected at the back gap and that the yoke 216 is magnetically connected to the pedestal 304. A first difference in the write head 300 is that an insulation layer 306, such as baked photoresist, is formed on top of the insulation layer 212 and extends into the stitch region 234 of the second pole tip. The insulation layer 222 in FIG. 14 may now be omitted. More importantly, however, is that the insulation layer 306 provides a profile which elevates the stitch region of the second pole tip into a pedestal which is shown at 234 upon the plating of the second pole tip 214. The write gap layer 228 is located between the P1 pedestal and the second pole tip 214 and may extend over the insulation layer 306 if desired.

Important steps in fabrication of the head 300, shown in FIG. 17, are shown in FIGS. 15 and 16. In FIG. 15 a thick layer of alumina 308 is deposited over the entire wafer. In FIG. 16 the alumina layer is CMP until a top surface of the pedestal 234 (stitch region) and the top surfaces of the write coil layer 220 are exposed with these surfaces and a top surface of an alumina layer 310 being planar, as shown in FIG. 16. However, the CMP is terminated before a remaining layer portion 310 of the alumina is removed from the write portion 232 of the second pole tip. It should be noted in this embodiment that the alumina layer fills in between the coils of the write coil 220 and that the baked photoresist layer 224 in FIG. 14 is omitted. In FIG. 17 the yoke 216 is formed magnetically connected to the exposed pedestal 234 of the second pole tip and magnetically connected to the back gap pedestal 304. Before depositing the yoke 216 a baked photoresist layer 312 (I5) may be formed on top of the write coil 220 for insulating it from the yoke 216. Again, it should be noted that the insulation layer portion 310 at the write portion 232 has protected the height of the second pole tip from the yoke seed layer removal and subsequent construction of studs (not shown) to terminals of the read and write head portions of the head 300. It should be understood that the pedestal 234 may be constructed in other ways than as shown in FIGS. 15–17, such as by etching the write portion 232 to a desired depth or performing two plating steps wherein the pedestal 234 is plated separately from a main body of the second pole tip therebelow. After completion of the P2 yoke 216 an overcoat layer 314 may be formed.

Figure 18:
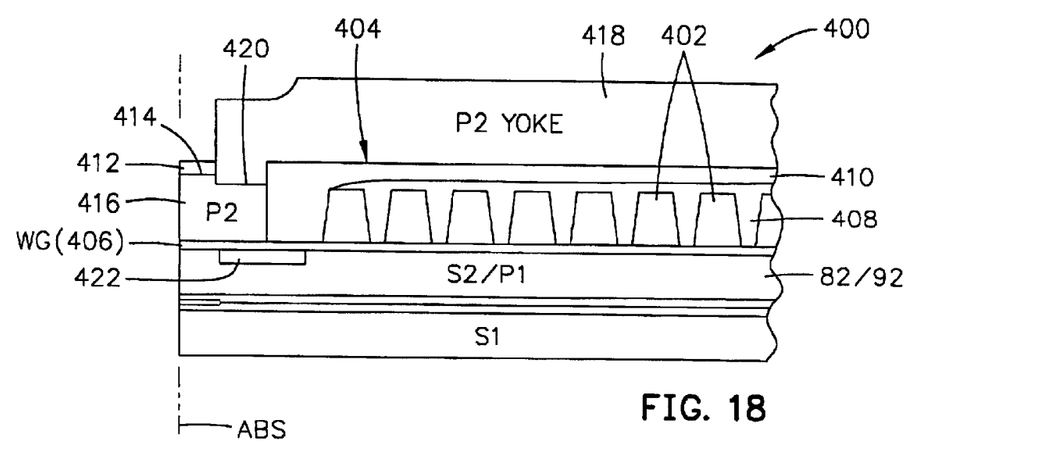
FIG. 18 is a side view of a third embodiment of the present invention.

Still another embodiment 400 of the present invention is illustrated in FIG. 18 which employs a single write coil layer 402. The write coil layer 402 is located within an insulation stack 404 which includes a first insulation layer 406, a baked photoresist layer 408 between the turns of the coil and a third insulation layer 410 on top of the coil layer which may be constructed by first depositing a thick layer of alumina and then CMP. This last step may be employed for leaving a small amount of insulation 412 over a write portion 414 of the second pole tip 416. This also planarizes the head and also maintains the yoke 418 flat as it extends across the head and it is extended to a stitch region 420 of the second pole tip.

The head 400 may include an insulation layer 422 which is inset within the first pole piece (P1) 92 at a location recessed from the ABS and between the ABS and a commencement of the write coil layer 402. The front end of the insulation layer 422 defines a location of the zero throat height (ZTH) of the magnetic head where the first and second pole pieces first commence to separate after the ABS. This minimizes flux leakage between the first and second pole pieces.

Figure 19:
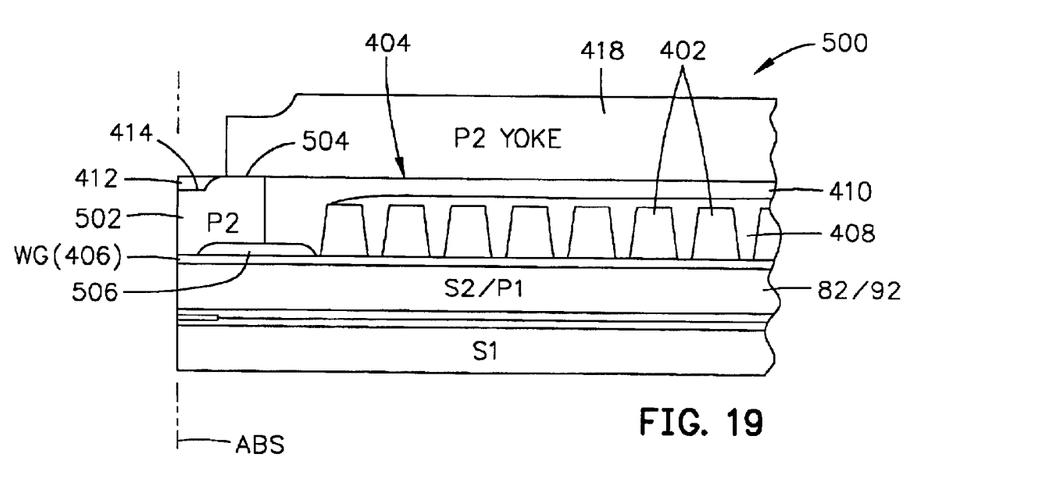
FIG. 19 is a side view of a fourth embodiment of the present invention.

FIG. 19 illustrates still another head 500 of the present invention which is the same as the head 400 in FIG. 18 except a second pole tip 502 has a pedestal 504 and a zero throat height (ZTH) defining insulation layer 506. The ZTH defining insulation layer 506 is recessed from the ABS and is located entirely between the ABS and the commencement of the write coil layer 402. The front portion of the layer 506 defines the ZTH as described hereinabove. However, the ZTH insulation layer 506 also provides a profile which forms the pedestal 504 at the stitch region of the second pole tip when the second pole tip is formed by plating. Accordingly, the ZTH insulation layer 506 performs a double function in the embodiment shown in FIG. 19.

Discussion

Exemplary materials for the various components of the aforementioned heads may be nickel iron ($Ni_{89}Fe_{21}$) for the layers of the first and second pole pieces, copper (Cu) for the write coil layers, alumina ($Al_2O_3$) or silicon dioxide ($SiO_2$) for the write gap layer and the insulation layers that are CMP and copper or nickel iron for the various seed layers. In a broad concept of the invention it should be understood that the write portion of the second pole tip at the ABS is simply protected by an insulation layer from subsequent processing steps regardless of the remainder of the configuration of the head.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A method of making a magnetic head, which has an air bearing surface (ABS) and a back gap (BG), comprising the steps of:

forming a second pole tip of a second pole piece with a top surface and a bottom surface at an ABS site for said ABS;

the top surface of the second pole tip having a write region located at the ABS site and a stitch region which is recessed from the ABS site toward said back gap;

depositing a protective sacrificial layer on the write and stitch regions of the second pole tip;

removing said sacrificial layer from only the stitch region of the second pole tip; and forming a second pole piece yoke of a second pole piece magnetically connected to the stitch region of the second pole tip.

2. A method of making a magnetic head as claimed in claim 1 wherein the sacrificial layer is alumina.

3. A method of making a magnetic head as claimed in claim 2 including the steps of:

forming a first shield layer;

forming first and second read gap layers;

forming a read sensor between the first and second read gap layers; and forming the first and second read gap layers between the first shield layer and the second pole piece layer.

4. A method of making a magnetic head as claimed in claim 1 including the steps of:

forming a first pole piece layer of a first pole piece;

forming a nonmagnetic write gap layer on the first pole piece layer;

forming a first write coil layer on the write gap layer; and the forming of the second pole tip forming the bottom surface of the second pole tip on the write gap layer.

5. A method of making a magnetic head as claimed in claim 4 including:

said depositing of the sacrificial layer also deposits the sacrificial layer on the stitch region of the second pole tip.

6. A method of making a magnetic head as claimed in claim 5 including:

said depositing of the sacrificial layer also deposits the sacrificial layer over the first write coil layer;

chemically mechanically polishing the sacrificial layer until the sacrificial layer is flat, but stopping the chemical mechanical polishing before the top surface of the second pole tip is exposed; and before forming the second pole piece yoke, said removing said sacrificial layer including etching or ion milling the sacrificial layer from the stitch region of the second pole tip until the stitch region is exposed.

7. A method of making a magnetic head as claimed in claim 6 including the step of forming an inset insulation layer inset in the first pole piece layer between the ABS and the first write coil layer for defining a zero throat height of the head.

8. A method of making a magnetic head as claimed in claim 7 wherein the sacrificial layer is alumina.

9. A method of making a magnetic head as claimed in claim 6 including:
- the forming of the second pole tip also forms the second pole tip with a pole tip pedestal in the stitch region of the second pole tip;
- said removing of the sacrificial layer includes chemically mechanically polishing the sacrificial layer until the sacrificial layer is flat and the pole tip pedestal in the stitch region is exposed, but stopping the chemical mechanical polishing before the write region of the second pole tip is exposed; and
- the forming of the second pole piece yoke magnetically connects the second pole piece yoke to the second pole tip pedestal.

10. A method of making a magnetic head as claimed in claim 9 including the step of forming a ZTH defining insulation on the first pole piece layer entirely between the ABS and the first write coil layer for defining a zero throat height (ZTH) of the head.

11. A method of making a magnetic head as claimed in claim 10 wherein the sacrificial layer is alumina.

12. A method of making a magnetic head, which has an air bearing surface (ABS) and a back gap (BG), comprising the steps of:
- forming a second pole tip of a second pole piece with a top surface and a bottom surface at an ABS site for said ABS;
- the top surface of the second pole tip having a write region located at the ABS site and a stitch region which is recessed from the ABS site toward said back gap;
- depositing a protective sacrificial layer on the write region of the second pole tip;
- forming a second pole piece yoke of a second pole piece magnetically connected to the stitch region of the second pole tip;
- said depositing of the sacrificial layer also deposits the sacrificial layer on the stitch region of the second pole tip;
- removing said sacrificial layer from the stitch region of the second pole tip;
- the forming of the second pole tip also forms the second pole tip with a pole tip pedestal in the stitch region;
- said depositing of the sacrificial layer also deposits the sacrificial layer over a first write coil layer;
- said removing of the sacrificial layer includes chemically mechanically polishing the sacrificial layer until the sacrificial layer is flat and the pole tip pedestal in the stitch region is exposed, but stopping the chemical mechanical polishing before the write region of the second pole tip is exposed; and
- the forming of the second pole piece yoke magnetically connects the second pole piece yoke to the second pole tip pedestal.

13. A method of making a magnetic head as claimed in claim 12 including the steps of:
- forming a first insulation layer directly on the write gap layer with a front portion which is recessed from the ABS toward the back gap but is located under a pedestal site of the second pole tip pedestal; and
- said forming of the second pole tip forms the second pole tip with said second pole tip pedestal without additional processing steps because of a profile of the front portion of said first insulation layer.

14. A method of making a magnetic head as claimed in claim 13 wherein the sacrificial layer is alumina.

15. A method of making a magnetic head, which has an air bearing surface (ABS) and a back gap (BG), comprising the steps of:
- forming a second pole tip of a second pole piece with a top surface and a bottom surface at an ABS site for said ABS;
- the top surface of the second pole tip having a write region located at the ABS site and a stitch region which is recessed from the ABS site toward said back gap;
- depositing a protective sacrificial layer on the write region of the second pole tip;
- forming a second pole piece yoke of a second pole piece magnetically connected to the stitch region of the second pole tip;
- said depositing of the sacrificial layer also deposits the sacrificial layer on the stitch region of the second pole tip;
- removing said sacrificial layer from the stitch region of the second pole tip;
- forming a first pole piece layer of a first pole piece;
- depositing a first alumina layer on the first pole piece layer;
- chemically mechanically polishing the first alumina layer;
- forming a first write coil on the first alumina layer after chemical mechanical polishing the first alumina layer;
- removing a first portion of the first alumina layer to expose a stitch region of the first pole piece layer which is located at said ABS site and between the ABS site and the back gap and removing a second portion of the first alumina layer at the back gap exposing a back gap region of the first pole piece layer;
- forming a first pedestal of the first pole piece connected to the stitch region of the first pole piece layer and forming a second pedestal of the first pole piece connected to the back gap region of the first pole piece layer;
- said forming of the write gap layer forming the write gap layer on a top of the first pedestal of the first pole piece and on a top surface of the second pedestal of the first pole piece;
- said forming of the second pole tip forms the second pole tip on the write gap layer above the first pedestal of the first pole piece;
- forming a second write coil layer between the second pole tip and the back gap; and
- said depositing of the sacrificial layer also deposits the sacrificial layer on top of the second write coil layer.

16. A method of making a magnetic head as claimed in claim 15 including:
- the forming of the second pole tip also forms the second pole tip with a pole tip pedestal in the stitch region of the second pole tip;
- said depositing of the sacrificial layer also deposits the sacrificial layer over the first write coil layer;
- said removing of the sacrificial layer includes chemically mechanically polishing the sacrificial layer until the sacrificial layer is flat and the pole tip pedestal in the stitch region is exposed, but stopping the chemical mechanical polishing before the write region of the second pole tip is exposed; and
- the forming of the second pole piece yoke magnetically connects the second pole piece yoke to the second pole tip pedestal.

17. A method of making a magnetic head as claimed in claim 16 including the steps of:

forming a first insulation layer directly on the write gap layer with a front portion which is recessed from the ABS toward the back gap but is located under a pedestal site of the second pole tip pedestal; and said forming of the second pole tip forms the second pole tip with said second pole tip pedestal without additional processing steps because of a profile of the front portion of said insulation layer.

18. A method of making a magnetic head as claimed in claim 17 wherein the sacrificial layer is alumina.

19. A method of making a magnetic head as claimed in claim 18 including the steps of:

forming a first shield layer;

forming first and second read gap layers;

forming a read sensor between the first and second read gap layers; and forming the first and second read gap layers between the first shield layer and the second pole piece layer.

* * * * *